United States Patent Office 3,492,338
Patented Jan. 27, 1970

3,492,338
D-HOMOSTEROIDS AND PROCESS FOR THEIR PREPARATION
Josef Hader, Friedmund Neumann, and Rudolf Wiechert, Berlin, Germany, assignors to Schering A.G., Berlin, Germany
No Drawing. Filed Dec. 8, 1966, Ser. No. 600,028
Claims priority, application Germany, Dec. 11, 1965, Sch 38,160
Int. Cl. C07c *17/04;* A61k *17/00*
U.S. Cl. 260—488                25 Claims

ABSTRACT OF THE DISCLOSURE

A compound of the formula

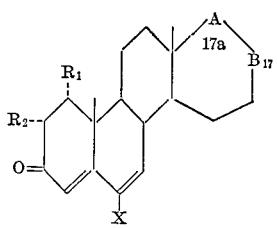

(I)

wherein each of $R_1$ and $R_2$ is hydrogen and $R_1$ and $R_2$ together represent a methylene group, X is a member selected from the group consisting of hydrogen, lower alkyl, chlorine and fluorine, and A—B is selected from the group of

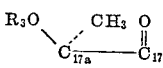

and

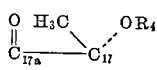

in which $R_3$ and $R_4$ are each selected from the group consisting of hydrogen and acyl, and the process of preparing such compound which comprises contacting a compound of the formula

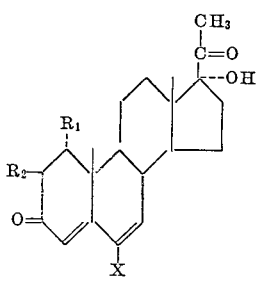

II wherein $R_1$, $R_2$ and X are as above defined with a member selected from the group consisting of acidic and basic catalysts and dependent on the meaning of $R_3$ and $R_4$ in the final product as defined above, if desired, in the resulting compound any free hydroxyl group is esterified or any esterified hydroxyl group is saponified and, if desired, this saponified group is reesterified.

The invention is directed to D-homosteroids constituting androgen antagonists having the formula

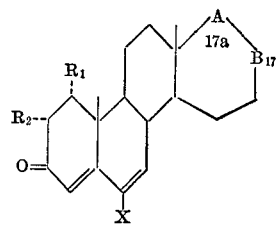

(I)

wherein $R_1$ and $R_2$ are hydrogen or, taken together, form a methylene group, X is hydrogen, lower alkyl, fluorine or chlorine, and A—B preferably represents the group

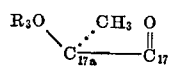

or

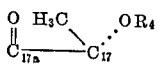

wherein $R_3$ and $R_4$ are hydrogen or acyl. The D-homosteroids of the above formula are prepared by treating compounds of the formula

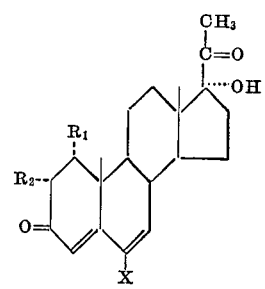

II wherein $R_1$, $R_2$, and X are as defined above with a basic or acid catalyst, and depending on the meaning of $R_3$ and $R_4$ in the final product as defined above, if desired, in the resulting compound any free hydroxyl group is esterified or any esterified hydroxyl group is saponified and, if desired, this saponified group is reesterified.

The present invention relates to novel D-homosteriods having androgen antagonistic properties, compositions including the same as active ingredient, and a process for preparing the novel compounds.

A large number of homosteroid compounds having a broad range including very different properties have been described. D-homosteroids characterized by specific androgen antagonistic activity, however, are not as yet known.

It is therefore an object of the present invention to provide D-homosteroids characterized by androgen antagonist activity.

It is a further object of the present invention to provide a process for the preparation of D-homosteroids having androgen antagonist activity.

It is another object of the present invention to provide a method for use in the treatment of diseases and disorders caused by or connected with androgens.

It is still another object of the present invention to provide compositions containing an effective amount of a D-homosteroid having androgen antagonist activity.

Other objects will become apparent from the following description:

In accordance with the invention it has been found that D-homosteroids of the formula

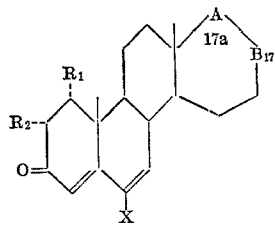

wherein $R_1$ and $R_2$ are each hydrogen or, taken together, a methylene group, X is hydrogen, lower alkyl, fluorine or chlorine, and A—B is preferably

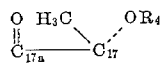

or

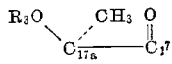

wherein $R_3$ and $R_4$ are hydrogen or acyl, have utility as androgen antagonists.

The D-homosteroids as set out above are characterized by particularly marked androgen antagonistic activity and are therefore of value as therapeutic agents in those instances where a high degree of androgen antagonistic activity is desired. The properties of the D-homosteroids according to the present invention can be modified by the conventional procedures as, for instance, by introduction of different groups into the molecule of the compound designated by Formula I above. Thus, in addition to hydrogen, fluorine or chlorine, X may be a lower alkyl group having from 1 to 8 carbon atoms and preferably from 1 to 5 carbon atoms. $R_3$ and $R_4$ can be hydrogen or an acyl group and, in the latter case, designate esterified residues of the common inorganic acids, such as sulfuric acid, phosphoric acid, and the like; or designate the group RCO wherein R is a branched or unbranched alkyl or alkenyl group or an aromatic or hydroaromatic group, in which connection all of said groups may be mono- or poly-substituted, the substituent preferably being a halo, hydroxy, carboxy, or amino group. Consequently the acyl groups having preferably 1 to 12 carbon atoms may be esterified residues of the following aliphatic, mono- or dicarboxylic acids, such as acetic acid, propionic acid, isobutyric acid, caproic acid, caprylic acid, valerianic acid, onanthic aid, undecanoic acid, undecylenic acid, malonic acid, fumaric acid, glutaric acid, and the like. The aforementioned aliphatic acids may be substituted, preferably by halogen, as for instance chlorine, or by hydroxy, or amino groups. Instances of aliphatic acids of this type include mono and dichloroacetic acid, glyceric acid, hydroxy and amino propionic acid, and the like.

The substituted or unsubstituted aromatic acyl groups of the following acids are included within the scope of the invention: benzoic acid, nicotinic acid, and the like.

In accordance with the invention, the new D-homosteroids can be prepared from starting materials having the Formula II

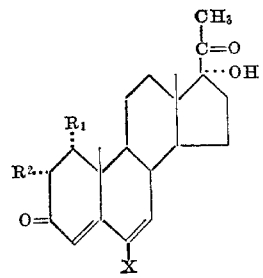

wherein $R_1$, $R_2$, and X are as defined above by treating such starting materials with catalysts, i.e., acid or basic catalysts, whereby the configurations $$\begin{array}{c} O \quad H_3C \quad OR_4 \\ \parallel \quad \diagdown \quad \diagup \\ C_{17a} \text{———} C_{17} \end{array}$$

or $$\begin{array}{c} R_3O \quad CH_3 \quad O \\ \diagdown \quad \diagup \quad \parallel \\ C_{17a} \text{———} C_{17} \end{array}$$

are obtained and depending on the meaning of $R_3$ and $R_4$ in the final product as defined above, if desired, in the resulting compound any free hydroxyl group is esterified or any esterified hydroxyl group is saponified and, if desired, this saponified group is reesterified.

The starting materials of Formula II can be obtained by the method described in U.S. Patent 3,234,093; German Patent 1,189,991; U.S. Patent 3,127,396; U.S. Patent 3,138,589, and U.S. Patent 3,042,688.

As has been set out above, the conversion of the 17-hydroxy-20-ketones to the corresponding D-homosteroids is effected by treatment with a basic or acid catalyst. Depending on the basic or acidic character of the catalyst used, D-homosteroids are obtained which differ one from the other with respect to the position of the keto group and the position and the stearic configuration of the hydroxyl group.

The enlargement of the D-ring to the D-homosteroid-17-ketone is preferably effected using basic catalysts, such as alkaline earth hydroxides, for instance, magnesium hydroxide, calcium hydroxide, strontium hydroxide, barium hydroxide or basic aluminum oxide. When the reaction is catalyzed by basic aluminum oxide, the same is advantageously conducted in such a manner that the basic aluminum oxide and the steroid used as starting material are maintained in contact with one another for a longer period of time, the contacting being effected in the presence of a non-polar solvent such as benzene. Following completion of this phase of the reaction, the D-homosteroid formed is extracted from the reaction mixture using polar solvent such as methanol, ethanol, acetone, acetic acid ester, chloroform, or the like.

The reaction when effected with alkaline earth hydroxides takes place most advantageously in alcoholic suspension, preferably in methanol, at the boiling temperature of the alcohol used. Alkali-metal hydroxide, such as lithium hydroxide, is, in principle, suitable for use as basic catalysts, but their use is less advantageous in those cases where halogen compounds are involved.

The acid catalyst transposition to the 17-α-ketones takes place, for example, in the presence of Lewis acids, such as boron trifluoride etherate or aluminum alkoxides as, for example, aluminum tert.butylate. When aluminum alkoxides are employed, the reaction mixture is heated, preferably in the presence of a solvent such as benzene, toluene or xylene, the 17-α-hydroxy compound being thereby obtained in excellent yield.

The reaction, when catalyzed by boron trifluoride, proceeds most advantageously in the presence of acetic acid as solvent and in the presence of acetic acid anhydride. Under the aforesaid conditions, the 17-α-acetoxy compound is obtained, the boron trifluoride is preferably used in the form of its etherate, although other solvents than ethers, such as benzene, toluene, tetrahydrofuran or dioxan may be used.

As has been noted above, the D-homosteroids according to the present invention and, in particular, the 17-ketones obtained by alkaline conversion constitute highly active androgen antagonistic agents. The androgen antagonistic activity of the compounds of the invention was evaluated in a test procedure employing one-day old male chicks, i.e., cockscomb. The animals were maintained for a period of 7 days on 0.1 mg. testosterone propionate per day and simultaneously were given graduated doses of the test compound either intramuscular or perorally. On the eighth day, the animals were killed and the weight of both the animal and of the comb was separately determined. The degree of the androgen antagonist effect is measured by the quotient of the comb weight in milligrams:body weight in grams, the values which were determined being set out in the following Tables I and II. The untreated controls as can be seen from the tables have a small quotient (0.33) whereas animals who had been treated only with testosterone propionate have a high quotient (1.13). The smaller the quotient obtained in those animals which received both testosterone propionate and an androgen antagonist, the stronger is the androgen antagonist activity of the compound employed. In the following tables the effect of the D-homosteroid (IV) according to the present invention as compared with the activity of two compounds (I) and (II) comprises known androgen antagonists and of the starting material (III) which itself constitutes an androgen antagonist, can be seen.

TABLE 1

| Substance 7 x i.m. | Dosage in mg., animal/day of test substance | Quotient, Comb-weight, mg./ Body weight, g. |
|---|---|---|
| Untreated controls | 0 | 0 33 |
| 0.1 mg. Testosteronepropionate (TP) | 0 | 1.13 |
| (I) $\Delta^1$-testolactone | 10.0 | 0.92 |
| +0.1 mg. TP | 3.0 | 1.00 |
| (II) Progesterone | 10.0 | 0.48 |
| +0.1 mg. TP | 3.0 | 0.77 |
|  | 1.0 | 0.98 |
| (III) 6-chloro-1,2$\alpha$-methylene-$\Delta^{4,6}$-pregnadiene-17$\alpha$-ol-3,20-dione | 3.0 | 0.76 |
|  | 1.0 | 0.87 |
| +0.1 mg. TP | 0.3 | 0 98 |
| (IV) 6-chloro-17a$\alpha$-methyl-1,2$\alpha$-methylene-D-homo-$\Delta^{4,6}$-androstadiene-17a$\beta$-ol-3,17 dione +0.1 mg. TP | 1.0 | 0.30 |
|  | 0.3 | 0.51 |
|  | 0.1 | 0.79 |

TABLE II

| Substance 7 x p.o. | Dosage in mg., animal/day of test substance | Quotient, Comb-weight, mg./ Body weight, g. |
|---|---|---|
| (II) Progesterone | 10 0 | 0.98 |
| +0.1 mg TP | 3.0 | 1.29 |
| (III) 6-chloro-1,2$\alpha$-methylene-$\Delta^{4,6}$-pregnadiene-17$\alpha$-ol-3,20-dione +0.1 mg.TP | 10.0 | 0.78 |
|  | 3.0 | 1.62 |
| (IV) 6-chloro-17a$\alpha$-methyl-1,2$\alpha$-methylene-D-homo $\Delta^{4,6}$-androstadiene-17a$\beta$-ol-3,17-dione +0.1 mg. TP | 3.0 | 0.38 |
|  | 1.0 | 0.51 |
|  | 0.3 | 0.61 |
|  | 0.1 | 0.73 |

D-homosteroids having androgen antagonistic activity have heretofore not been described. The above tables illustrate that the transposition of the $C_{17}$ side chain (III) to the D-homosteroid (IV) causes an increase in activity amounting to between 30 to 100.

Because of the testosterone antagonism manifested by the steroids according to the invention, these compounds can be used in the treatment of all diseases and conditions which are caused by, or associated with, an androgen hyper-production, such as infantile acne vulgaris, and hirsutism. The compounds of the invention can be administered both subcutaneously, intramuscularly, or orally.

The preparation of the actual therapeutic agents is carried out by the methods of the art. The active agents are formulated together with the usual ingredients, such as carriers, taste improvement agents, dispersants, and the like. For parenteral application, oily solutions prepared using sesame or castor-oil are preferred. In addition to the oil, agents increasing the solubility, i.e., solubilizing or dissolution aids, may be incorporated as, for example, benzyl benzoate or benzyl alcohol. For oral administration, the compounds can be used in the form of tablets, dragées, capsules, pills or as liquids, i.e., suspensions or solutions.

Tablets constitute a preferred mode of administration. A typical formulation is set out hereinafter Active substance:
    6 - chloro - 17a$\alpha$ - methyl - 1,2$\alpha$ - methylene-D - homo - $\Delta^{4,6}$-androstadiene - 17a$\beta$ - ol-3,17-dione _____mg__ 10.000
Filling agent:
    Cornstarch (USP 16) _____mg__ 66.565
    Lactose (DAB 6) _____mg__ 36.000
    Talcum (DAB 6) _____mg__ 6.000
    Gelatine, white (DAB 6) _____mg__ 1.400
Preservative:
    p - Hydroxy - benzoic - acid - methylester (DAB 6, 3rd supplement) _____ 24$\gamma$
    p - Hydroxy - benzoic - acid - propylester (DAB 6, 3rd supplement) _____ 11$\gamma$
Weight of tablet _____mg__ 120.000

The tablets are prepared in the conventional manner from the above formulation using the conventional equipment.

The dosage of the compounds as set out herein depends on the condition which is being treated as well as the effect sought to be realized. Generally, 20 to 200 mg. of active substance are given in 3 to 15 divided doses per day in treating diseases caused by androgen production or which are connected with such androgen production.

In clinical treatment it has been observed that after 3 months an improvement or alleviation of the condition has taken place.

In order that the invention may be more fully understood, reference should be had to the following specific examples in which are disclosed the compounds and processes coming within the scope of the present invention. It will be understood that these examples are given for illustrative purposes merely and are not intended as limitations of the invention:

EXAMPLE 1

5.0 g. 6-chloro-1,2$\alpha$-methylene-$\Delta^{4,6}$-pregnadiene-17$\alpha$-ol-3,20-dione in benzene were adsorbed on a fifty-fold amount of basic aluminum oxide containing 1% of water. After a reaction time of 24 hr. the reaction product was extracted with methanol, which was then evaporated to dryness in vacuo. The residue was recrystallized from methanol with the addition of methylene chloride. The yield of 6-chloro-1,2$\alpha$-methylene-17a$\alpha$-methyl-D-homo-$\Delta^{4,6}$-androstadiene-17a$\beta$-ol-3,17-dione having a melting point of 265–268° C. (decomposition) amounted to 1.2 g.

UV: $\epsilon_{283}$=17.400.

300 mg. 6-chloro-1,2$\alpha$-methylene-17a$\alpha$-methyl-D-homo-$\Delta^{4,6}$-androstadiene-17a$\beta$-ol-3,17-dione were stirred for 17 hours at room temperature in 6 ml. glacial acetic acid with 3 ml. acetic acid anhydride and 150 mg. p-toluene-sulfonic acid. Afterwards the reaction mixture was poured into ice-water/pyridine with stirring, the precipitate separated by suction, washed till neutral and dried. After recrystallization from methanol 210 mg. 6-chloro-1,2$\alpha$-methylene - 17a$\alpha$ - methyl - D - homo - $\Delta^{4,6}$ - androstadiene-17a$\beta$-ol-3,17-dione-17a-acetate were obtained having a melting point of 272–274° C.

UV: $\epsilon_{282}$=17.400.

400 mg. 6-chloro-1,2$\alpha$-methylene-17a$\alpha$-methyl-D-homo-$\Delta^{4,6}$-androstadiene-17a$\beta$-ol-3,17-dione were stirred in 8 ml. propionic acid with 4 ml. propionic acid anhydride and 200 mg. p-toluene-sulfonic acid for 10 hours at room temperature. The reaction mixture was stirred in ice water/pyridine, the precipitate separated by suction, dissolved in methylene-chloride, washed with sodium-bicarbonate-solution and water, and dried over sodium sulfate. After evaporation to dryness, the residue was recrystallized from isopropyl ether. The yield amounted to 320 mg. 6 - chloro - 1,2$\alpha$ - methylene - 17a$\alpha$ - methyl - D-homo - $\Delta^{4,6}$ - androstadiene - 17a$\beta$ - ol - 3,17 - dione - 17a-propionate having a melting point of 212–213.5° C.

UV: $\epsilon_{282}$=17.100.

EXAMPLE 2

3,0 g. 6-fluoro-1,2α-methylene-Δ$^{4,6}$-pregnadiene-17α-ol-3,20-dione were adsorbed on basic aluminum oxide and then worked up as described in Example 1.

6 - fluoro - 1,2α - methylene - 17aα - methyl - D - homo-Δ$^{4,6}$-androstadiene-17aβ-ol-3,17-dione were recovered.

UV: $\epsilon_{280}=19.000$.

350 mg. 6-fluoro-1,2α-methylene-17aα-methyl-D-homo-Δ$^{4,6}$-androstadiene-17aβ-ol-3,17-dione were stirred in 7 ml. glacial acetic acid and 3.5 ml. acetic acid anhydride and 175 mg. p-toluenesulfonic acid added thereto, and the mixture worked up as described in Example 1.

6 - fluoro - 1,2α - methylene - 17aα - methyl - D - homo-Δ$^{4,6}$-androstadiene-17aβ-ol-3,17-dione-17a-acetate were recovered.

UV: $\epsilon_{280}=18.900$.

400 mg. 6-fluoro-1,2α-methylene-17aα-methyl-D-homo-Δ$^{4,6}$-androstadiene-17aβ-ol-3,17-dione were stirred in 4 ml. caproic acidanhydride with 200 mg. p-toluenesulfonic acid for 24 hours at room temperature. After ice-water precipitation, the precipitate was stirred by suction and dissolved in methylene chloride, the methylene-chloride solution was washed with sodium bicarbonate solution and water and then evaporated to dryness in vacuo after drying over sodium sulfate. There were recovered 6-fluoro-1,2α-methylene-17aα-methyl-D-homo-Δ$^{4,6}$-androstadiene-17aβ-ol-3,17-dione-17a-capronate in the form of an oil.

UV: $\epsilon_{280}=18.600$.

EXAMPLE 3

2.5 g. 6-chloro-Δ$^{4,6}$-pregnadiene-17α-ol-3,20-dione were adsorbed in basic aluminum oxide and worked up according to Example 1.

There were recovered 6-chloro-17aα-methyl-D-homo-Δ$^{4,6}$-androstadiene-17aβ-ol-3,17-dione.

UV: $\epsilon_{281}=21.500$.

400 mg. 6-chloro-17aα-methyl-Δ$^{4,6}$-D-homo-androstadiene-17aβ-ol-3,17-dione were reacted and worked up according to Example 1 in 8 ml. glacial acetic acid with 4 ml. acetic acid anhydride and 200 mg. p-toluenesulfonic acid.

There were recovered 6-chloro-17aα-methyl-D-homo-Δ$^{4,6}$-androstadiene-17aβ-ol-3,17-dione-17a-acetate.

UV: $\epsilon_{281}=21.600$.

EXAMPLE 4

4.0 g. 1,2α-methylene-Δ$^{4,6}$-pregnadiene-17α-ol-3,20-dione were adsorbed on basic aluminum oxide and worked up according to Example 1.

There were recovered 850 mg. 1,2α-methylene-17aα-methyl - D - homo - Δ$^{4,6}$ - androstadiene - 17aβ - ol - 3,17-dione having a melting point of 263.5–268° C.

UV: $\epsilon_{283}=21.500$.

300 mg. 1,2α-methylene-17aα-methyl-D-homo-Δ$^{4,6}$-androstadiene-17aβ-ol-3,17-dione were reacted and worked up according to Example 1 in 6 ml. glacial acetic acid with 3 ml. acetic acid anhydride and 150 mg. p-toluenesulfonic acid according to Example 1.

There were recovered 1,2α-methylene-17aα-methyl-D-homo-Δ$^{4,6}$-androstadiene-17aβ-ol-3,17-dione-17a-acetate.

UV: $\epsilon_{283}=21.600$.

EXAMPLE 5

4.0 g. 6-methyl-Δ$^{4,6}$-pregnadiene-17α-ol-3,20-dione were adsorbed on basic aluminum oxide and worked up according to Example 1.

There were recovered 6,17aα-dimethyl-D-homo-Δ$^{4,6}$-androstadiene-17aβ-ol-3,17-dione.

UV: $\epsilon_{290}=24.000$.

500 mg. 6,17aα-dimethyl-D-homo-Δ$^{4,6}$-androstadiene-17aβ-ol-3,17-dione were reacted and worked up according to Example 1 in 10 ml. glacial acetic acid with 5 ml. acetic acid anhydride and 250 mg. p-toluene-sulfonic acid.

There were recovered 6,17aα-dimethyl-D-homo-Δ$^{4,6}$-androstadiene-17aβ-ol-3,17-dione-17a-acetate.

UV: $\epsilon_{290}=24.100$.

EXAMPLE 6

1.0 g. 6-chloro-1,2α-methylene-Δ$^{4,6}$-pregnadiene-17α-ol-3,20-dione were refluxed with stirring in 150 ml. methanol with 10.0 g. barium-hydroxide for 3 hours. Thereafter the solids were rinsed by filtration, the solution concentrated in vacuo, taken up in methylene-chloride and washed with water. After drying over sodiumsulfate and evaporating to dryness, the residue was recrystallized from methanol with the addition of methylenechloride. There were recovered 210 mg. 6-chloro-1,2α-methylene-17aα - methyl - D - homo - Δ$^{4,6}$ - androstadiene - 17aβ-ol-3,17-dione having a melting point of 264–267° C.

UV: $\epsilon_{282}=17.300$.

EXAMPLE 7

300 mg. 6-fluoro-1,2α-methylene-Δ$^{4,6}$-pregnadiene-17α-ol-3,20-dione were reacted and worked up in 110 ml. methanol with 8.0 g. bariumhydroxide as described in Example 6. There were recovered 6-fluoro-1,2α-methylene-17aα-methyl-D-homo-Δ$^{4,6}$-androstadiene-17aβ-ol-3,17-dione.

UV: $\epsilon_{280}=18.300$.

EXAMPLE 8

1.1 g. 6-chloro-Δ$^{4,6}$-pregnadiene-17α-ol-3,20-dione were reacted and worked up in 130 ml. methanol with 11.0 g. strontium-hydroxide according to Example 6.

There were recovered 6-chloro-17aα-methyl-D-homo-Δ$^{4,6}$-androstadiene-17aβ-ol-3,17-dione.

UV: $\epsilon_{281}=21.300$.

EXAMPLE 9

500 mg. 1,2α-methylene-Δ$^{4,6}$-pregnadiene-17α-ol-3,20-dione were reacted and worked up in 70 ml. methanol with 5.0 g. bariumhydroxide according to Example 6.

There were recovered 110 mg. 1,2α-methylene-17aα-methyl - D - homo - Δ$^{4,6}$ - androstadiene - 17aβ - ol - 3,17 - dione having a melting point of 265–268° C.

UV: $\epsilon_{283}=21.700$.

EXAMPLE 10

600 mg. 6 - methyl - Δ$^{4,6}$ - pregnadiene - 17α - ol - 3,20 - dione were reacted and worked up in 90 ml. methanol with 6.0 g. strontiumhydroxide according to Example 6.

6,17aα - dimethyl - D - homo - Δ$^{4,6}$ - androstadiene - 17aβ - ol - 3,17 - dione were recovered.

UV: $\epsilon_{240}=16.100$.

EXAMPLE 11

2 g. 6 - chloro - 1,2α - methylene - Δ$^{4,6}$ - pregnadiene - 17α - ol - 3,20 - dione were refluxed in 400 ml. toluene with 2 g. aluminum tert.-butylate for 2 hours. The reaction mixture was cooled and thereafter treated with ice and as much 5% hydrochloric acid as necessary to dissolve the precipitated aluminum-hydroxide. The organic phase was separated, washed with water, dried over sodiumsulfate and evaporated. The residue was chromatographed on aluminum oxide and recrystallized from methanol.

0.75 g. 6 - chloro - 1,2α - methylene - 17β - methyl - D - homo - Δ$^{4,6}$ - androstadiene - 17α - ol - 3,17a - dione having a melting point of 230–231° C. was recovered.

EXAMPLE 12

200 mg. 6 - chloro - 1,2α - methylene - Δ$^{4,6}$ - pregnadiene - 17α - ol - 3,20 - dione were kept for 24 hours at room temperature in 40 ml. benzene absolute and 0.4 ml. borontrifluoride etherate. The reaction mixture was decomposed with ice-water, the organic phase extracted with methylene chloride and the extract washed, dried and evaporated. After recrystallization from methanol, 170 mg. 6-chloro-1,2α-methylene-17β-methyl-D-homo-Δ$^{4,6}$-androstadiene-17α-ol-3,17a-dione having a melting point of 230–231° C. were obtained.

EXAMPLE 13

175 mg. 6 - chloro - 1,2α - methylene - 17β - methyl - D - homo - Δ$^{4,6}$ - androstadiene - 17α - ol - 3,17a - dione were obtained according to Example 12 from 200 mg. 6-chloro - 1,2α - methylene - Δ$^{4,6}$ - pregnadiene - 17α - ol - 3,20 - dione in 40 ml. dioxan with 0.4 mg. borontrifluoride-etherate.

EXAMPLE 14

4.0 g. 6 - chloro - 1,2α - methylene - Δ$^{4,6}$ - pregnadiene - 17α - ol - 3,20 - dione were kept in 200 ml. glacial acetic acid with 4 ml. acetic acid anhydride and 4 ml. borontrifluoride-etherate for 3 days at room temperature. Thereafter the mixture was stirred into ice-water, the precipitate removed by suction, washed with water and taken up with methylene-chloride. After drying over sodiumsulfate and evaporating to dryness and recrystallizing from methanol, 3.9 g. 6-chloro-1,2α-methylene-17β-methyl - D - homo - Δ$^{4,6}$ - androstadiene - 17α - ol - 3,17α - dione - 17 - acetate having a melting point of 262.5–263° C. were obtained UV: $\epsilon_{281}$=17.600.

1.8 g. 6 - chloro - 1,2α - methylene - 17β - methyl - D - homo - Δ$^{4,6}$ - androstadiene - 17α - ol - 3,17α - dione - 17 - acetate were stirred in 350 ml. methanol with 28.8 ml. sodium hydroxide solution for 24 hours at room temperature. After neutralization with acetic acid the solution was substantially evaporated in vacuo. Thereafter it was diluted with water, the precipitate separated by suction, washed with water and taken up in methylene-chloride. After drying over sodium sulfate, evaporating to dryness and recrystallizing from methanol, 1.2 g. 6-chloro-1,2α-methylene - 17β - methyl - D - homo - Δ$^{4,6}$ - androstadiene - 17α - ol 3,17a - dione having a melting point of 230–231° C. were obtained.

UV: $\epsilon_{281}$=17.500.

400 mg. 6 - chloro - 1,2α - methylene - 17β - methyl - D - homo - Δ$^{4,6}$ - androstadiene - 17α - ol - 3,17α - dione were kept in 8 ml. propionic acid with 4 ml. propionic acid anhydride and 200 mg. p-toluenesulfonic acid for 24 hours at room temperature. After ice-water precipitation, the precipitate was separated off, taken up with methylene-chloride, washed with sodium bicarbonate solution and water and dried over sodium sulfate. Thereafter the solution was evaporated to dryness in vacuo and the residue recrystallized from isopropyl ether.

310 mg. 6 - chloro - 1,2α - methylene - 17β - methyl - D - homo - Δ$^{4,6}$ - androstadiene - 17α - ol - 3,17a - dione - 17 - propionate having a melting point of 165–165.5° were recovered.

UV: $\epsilon_{281}$=17.100.

EXAMPLE 15

3.0 g. 6 - fluoro - 1,2α - methylene - Δ$^{4,6}$ - pregnadiene-17α - ol - 3,20 - dione were reacted and worked up in 150 ml. glacial acetic acid with 3 ml. acetic acid anhydride and 3 ml. borontrifluoride etherate according to Example 14.

After recrystallization from methanol there were recovered 2,9 g. 6-fluoro-1,2α-methylene-17β-methyl-D-homo-Δ$^{4,6}$-androstadiene-17α-ol-3,17a-dione-17-acetate having a melting point of 219.5–220.5° C.

UV: $\epsilon_{280}$=18.800.

1.5 g. 6-fluoro-1,2α-methylene-17β-methyl-D-homo-Δ$^{4,6}$-androstadiene-17α-ol-3,17a-dione-17-acetate were reacted in 200 ml. methanol with 24 ml. 1 N sodium hydroxide solution according to Example 14.

After recrystallization from acetic acid ester amounted to 1.2 g. 6-fluoro-1,2α-methylene-17β-methyl-D-homo-Δ$^{4,6}$-androstadiene-17α-ol-3,17a-dione having a melting point of 205–206° C.

UV: $\epsilon_{280}$=19.200.

500 mg. 6-fluoro-1,2α-methylene-17β-methyl-D-homo-Δ$^{4,6}$-androstadiene-17α-ol-3,17a-dione were stirred into 5 ml. caproic acidanhydride with 250 mg. p-toluenesulfonic acid for 4 days at 37° C. After steam-distillation, the aqueous phase was extracted with methylene chloride and dried over sodium sulfate. After evaporation to dryness and chromatographing on silica-gel, 450 mg. 6-fluoro-1,2α-methylene-17β-methyl-D-homo-Δ$^{4,6}$ - androstadiene - 17α-ol-3,17a-dione-17-capronate in the form of an oil were obtained.

UV: $\epsilon_{280}$=18.500.

EXAMPLE 16

4.0 g. 6-chloro-Δ$^{4,6}$-pregnadiene-17α-ol-3,20-dione were reacted and worked up in 200 ml. glacial acetic acid with 4 ml. acetic acid anhydride and 4 ml. borontrifluoride etherate according to Example 14.

After recrystallization from isopropyl ether, 3.1 g. 6-chloro-17β-methyl-D-homo-Δ$^{4,6}$-androstradiene-17α-ol - 3, 17a-dione-17-acetate having a melting point of 160–161.5° C. were obtained.

UV: $\epsilon_{284}$=21.900.

1.7 g. 6-chloro-17β-methyl-D-homo-Δ$^{4,6}$-androstadiene-17α-ol-4,17a-dione-17-acetate were reacted and worked up in 300 ml. methanol with 29 ml. 1 N sodium hydroxide solution according to Example 14. A yield of 1.2 g. 6-chloro-17β-methyl-D-homo-Δ$^{4,6}$-androstadiene-17α-ol - 3, 17a-dione having a melting point of 226.5–227° C. was obtained.

UV: $\epsilon_{284}$=21.900.

EXAMPLE 17

3.5 g. 1,2α-methylene-Δ$^{4,6}$-pregnadiene-17α-ol - 3,20-dione were reacted and worked up in 175 glacial acetic acid with 3.5 ml. acetic acid anhydride and 3.5 ml. borontrifluoride etherate according to Example 14.

After recrystallization in methanol, 3.1 g. 1,2α-methylene-17β-methyl-D-homo-Δ$^{4,6}$-androstadiene-17α - ol - 3, 17a-dione-17-acetate having a melting point of 212.5–213.5° C. were obtained.

UV: $\epsilon_{281}$=21.500.

1.5 g. 1,2α-methylene-17β-methyl-D-homo-Δ$^{4,6}$ - androstadiene-17α-ol-3,17a-dione-17-acetate having a melting point of 200 ml. methanol with 24 ml. 1 N sodiumhydroxide solution according to Example 14 were obtained.

After recrystallization from acetic acid ester, 970 mg. 1,2α-methylene-17β-methyl-D-homo-Δ$^{4,6}$ - androstadiene-17α-ol-3,17a-dione having a melting point of 191–192° C. were obtained.

UV: $\epsilon_{281}$=21.700.

EXAMPLE 18

2.0 g. 6-methyl-Δ$^{4,6}$-pregnadiene-17α-ol-3,20-dione were reacted and worked up in 100 ml. glacial acetic acid with 2 ml. acetic acid anhydride and 2 ml. boron trifluoride etherate according to Example 14.

After recrystalizing, 6.17β-dimethyl-D-homo-Δ$^{4,6}$-androstadiene-17α-ol-3,17a-dione-17-acetate were recovered.

UV: $\epsilon_{290}$=24.400.

500 mg. 6,17β-dimethyl-D-homo-Δ$^{4,6}$ - androstadiene-17α-ol-3,17a-dione-17-acetate were reacted and worked up in 60 ml. methanol with 8 ml. 1 N sodium hydroxide solution according to Example 14. After recrystallizing, 6.17β-dimethyl-D-homo-Δ$^{4,6}$-androstadiene-17α-ol3,17a - dione were obtained.

UV: $\epsilon_{290}$=24.200.

What is claimed is as follows:

1. A compound of the formula

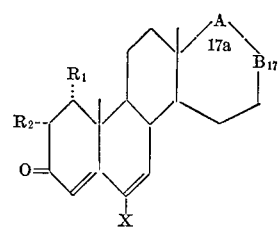

wherein each of $R_1$ and $R_2$ is hydrogen and $R_1$ and $R_2$ together represent a methylene group, X is a member selected from the group consisting of hydrogen, lower alkyl, chlorine and fluorine, A—B is selected from the group of

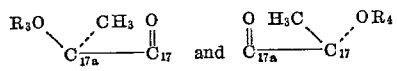

in which $R_3$ and $R_4$ are each selected from the group consisting of hydrogen and an aliphatic hydrocarbon carboxylic acid acyl having from 1 to 12 carbon atoms.

2. A compound according to claim 1 designated 6-chloro-1,2α-methylene 17aα-methyl-D-homo - $\Delta^{4,6}$ - androsta-diene-17aβ-ol-3,17-dione.

3. A compound according to claim 1 designated 6-chloro - 1,2α - methylene - 17aα - methyl - D - homo - $\Delta^{4,6}$-androstadiene-17aβ-ol-3,17-dione-17a-acetate.

4. A compound according to claim 1 designated 6-chloro - 1,2α - methylene - 17aα - methyl - D - homo - $\Delta^{4,6}$-androstadiene-17aβ-ol-3,17-dione-17a-propionate.

5. A compound according to claim 1 designated 6-fluoro - 1,2α - methylene - 17aα - methyl - D - homo - $\Delta^{4,6}$-androstadiene-17aβ-ol-3,17-dione.

6. A compound according to claim 1 designated 6-fluoro - 1,2α - methylene - 17aα - methyl - D - homo - $\Delta^{4,6}$-androstadiene-17aβ-ol-3,17-dione-17a-acetate.

7. A compound according to claim 1 designated 6-fluoro - 1,2α - methylene - 17aα - methyl - D - homo - $\Delta^{4,6}$-androstadiene-17aβ-ol-3,17-dione-17a-capronate.

8. A compound according to claim 1 designated 6-chloro - 17aα - methyl - D - homo - $\Delta^{4,6}$ - androstadiene - 17aβ-ol-3,17-dione.

9. A compound according to claim 1 designated 6-chloro - 17aα - methyl - D - homo - $\Delta^{4,6}$ - androstadiene - 17aβ-ol-3,17-dione-17a-acetate.

10. A compound according to claim 1 designated 1,2α-methylene - 17aα - methyl - D - homo - $\Delta^{4,6}$ - androstadiene-17aβ-ol-3,17-dione.

11. A compound according to claim 1 designated 1,2α-methylene - 17aα - methyl - D - homo - $\Delta^{4,6}$ - androstadiene-17aβ-ol-3,17-dione-17a-acetate.

12. A compound according to claim 1 designated 6, 17aα - dimethyl - D - homo - $\Delta^{4,6}$ - androstadiene - 17aβ-ol-3,17-dione.

13. A compound according to claim 1 designated 6, 17aα - dimethyl - D - homo - $\Delta^{4,6}$ - androstadiene - 17aβ-ol-3,17-dione-17a-acetate.

14. A compound according to claim 1 designated 6-chloro - 1,2α - methylene - 17β - methyl - D - homo - $\Delta^{4,6}$-androstadiene-17α-ol-3,17a-dione.

15. A compound according to claim 1 designated 6-chloro - 1,2α - methylene - 17β - methyl - D - homo - $\Delta^{4,6}$-androstadiene-17α-ol-3,17a-dione-17-acetate.

16. A compound according to claim 1 designated 6-chloro - 1,2α - methylene - 17β - methyl - D - homo - $\Delta^{4,6}$-androstadiene-17α-ol-3,17a-dione-17-propionate.

17. A compound according to claim 1 designated 6-fluoro - 1,2α - methylene - 17β - methyl - D - homo - $\Delta^{4,6}$-androstadiene-17α-ol-3,17a-dione-17-acetate.

18. A compound according to claim 1 designated 6-fluoro - 1,2α - methylene - 17β - methyl - D - homo - $\Delta^{4,6}$-androstadiene-17α-ol-3,17a-dione.

19. A compound according to claim 1 designated 6-fluoro - 1,2α - methylene - 17β - methyl - D - homo - $\Delta^{4,6}$-androstadiene-17α-ol-3,17a-dione-17-capronate.

20. A compound according to claim 1 designated 6-chloro - 17β - methyl - D - homo - $\Delta^{4,6}$ - androstadiene-17α-ol-3,17a-dione-17-acetate.

21. A compound according to claim 1 designated 6-chloro - 17β - methyl - D - homo - $\Delta^{4,6}$ - androstadiene-17α-ol-3,17a-dione.

22. A compound according to claim 1 designated 1,2α-methylene - 17β - methyl - D - homo - $\Delta^{4,6}$ - androstadiene-17α-ol-3,17a-dione-17-acetate.

23. A compound according to claim 1 designated 1,2α-methylene - 17β - methyl - D - homo - $\Delta^{4,6}$ - androstadiene-17α-ol-3,17a-dione.

24. A compound according to claim 1 designated 6, 17β - dimethyl - D - homo - $\Delta^{4,6}$ - androstadiene - 17α - ol-3,17a-dione-17-acetate.

25. A compound according to claim 1 designated 6, 17β - dimethyl - D - homo - $\Delta^{4,6}$ - androstadiene - 17α - ol-3,17a-dione.

References Cited

UNITED STATES PATENTS 3,150,184   9/1964   Moersch et al. _____ 260—586
3,264,345   8/1966   Moersch et al. _____ 260—586

OTHER REFERENCES

Chem. Abstracts, 62:6535a (1965), Shoppee et al.
Helv. Chim. Acta., vol. 26 (1943), pp. 186–189, Wendler et al.
Chem. and Industry, June 22, 1957, pp. 822–823.

JAMES A. PATTEN, Primary Examiner

V. GARNER, Assistant Examiner

U.S. Cl. X.R.

260—295.5, 410, 471, 473, 475, 476, 482, 484, 485, 486, 487, 586; 424—266, 308, 311, 313, 331